(12) United States Patent
Tajima

(10) Patent No.: US 8,578,877 B2
(45) Date of Patent: Nov. 12, 2013

(54) SPIN COATER, TEMPERATURE CONTROLLING METHOD OF THE SAME, OPTICAL DISC PRODUCTION APPARATUS, AND OPTICAL DISC PRODUCTION METHOD

(75) Inventor: Yukitoshi Tajima, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 780 days.

(21) Appl. No.: 12/594,836

(22) PCT Filed: Apr. 1, 2008

(86) PCT No.: PCT/JP2008/056841
§ 371 (c)(1),
(2), (4) Date: Oct. 6, 2009

(87) PCT Pub. No.: WO2008/126814
PCT Pub. Date: Oct. 23, 2008

(65) Prior Publication Data
US 2010/0062155 A1 Mar. 11, 2010

(30) Foreign Application Priority Data

Apr. 11, 2007 (JP) ................. 2007-103794
Jan. 9, 2008 (JP) ................. 2008-002581

(51) Int. Cl.
*B05C 11/02* (2006.01)
*B05C 11/08* (2006.01)

(52) U.S. Cl.
USPC ............. 118/666; 118/712; 118/641; 118/52; 118/58; 118/64; 118/320; 118/326; 427/240; 427/425

(58) Field of Classification Search
USPC ............... 118/52, 320, 666, 712, 641, 58, 64, 118/326; 427/240, 425
See application file for complete search history.

(56) References Cited

U.S. PATENT DOCUMENTS 5,127,362 A * 7/1992 Iwatsu et al. .................. 118/667
5,580,607 A * 12/1996 Takekuma et al. ............ 427/240
(Continued)

FOREIGN PATENT DOCUMENTS

JP    7-57308    3/1995
JP    8-87779    4/1996
(Continued)

OTHER PUBLICATIONS

JPO computer translation of JP 10-135101 A, published May 1998.*

(Continued)

*Primary Examiner* — Kristen Jolley
(74) *Attorney, Agent, or Firm* — Cooper & Dunham LLP

(57) ABSTRACT

The present invention provides a spin coater including a rotation table that rotatably holds the disc substrate, a spin-cup that surrounds the outer circumference of a disc substrate held on the rotation table, a dripping unit configured to drip an ultraviolet-curable resin composition onto the surface of the disc substrate, a rotating unit configured to rotate the disc substrate via the rotation table to spread the ultraviolet-curable resin composition over the surface of the disc substrate, a heating unit configured to heat the ultraviolet-curable resin composition on the disc substrate, and a temperature controlling unit configured to control a reaching temperature of the spin cup which is increased by the heating unit each time the ultraviolet-curable resin composition is spread, so as to be constant over multiple spin coating processes.

6 Claims, 12 Drawing Sheets

(56) References Cited

U.S. PATENT DOCUMENTS

| | | | |
|---|---|---|---|
| 5,916,368 A | 6/1999 | Ebert | |
| 6,074,482 A * | 6/2000 | Weber et al. | 118/642 |
| 6,107,608 A * | 8/2000 | Hayes | 219/444.1 |
| 6,110,280 A | 8/2000 | Ebert | |
| 6,242,044 B1 | 6/2001 | Ebert | |
| 6,284,044 B1 | 9/2001 | Sakamoto et al. | |
| 6,616,758 B2 * | 9/2003 | Hung et al. | 118/52 |
| 7,318,867 B1 * | 1/2008 | Fan et al. | 118/52 |
| 7,419,710 B2 | 9/2008 | Murata et al. | |
| 7,897,206 B2 * | 3/2011 | Vromans et al. | 427/240 |
| 2003/0102582 A1 | 6/2003 | Suzuki et al. | |
| 2004/0137751 A1 * | 7/2004 | Ou-Yang | 438/720 |
| 2006/0059501 A1 | 3/2006 | Vromans et al. | |

FOREIGN PATENT DOCUMENTS

| | | |
|---|---|---|
| JP | 09-129539 A * | 5/1997 |
| JP | 10-135101 | 5/1998 |
| JP | 10-249264 | 9/1998 |
| JP | 10-289489 | 10/1998 |
| JP | 10-320850 | 12/1998 |
| JP | 11-195250 | 7/1999 |
| JP | 11-195251 | 7/1999 |
| JP | 11-213495 | 8/1999 |
| JP | 2000-285528 | 10/2000 |
| JP | 2001-351275 | 12/2001 |
| JP | 2002-319192 | 10/2002 |
| JP | 2003-203400 | 7/2003 |
| JP | 3695109 | 7/2005 |
| JP | 2006-277803 | 10/2006 |
| JP | 2007-157309 | 6/2007 |
| TW | 2003000937 | 6/2003 |
| TW | I227485 | 2/2005 |
| WO | WO 2005/118159 A1 | 12/2005 |

OTHER PUBLICATIONS

JPO computer translation of JP 09-129539 A, published May 1997.*
Sep. 5, 2011 Taiwanese official action (with English translation) in connection with a counterpart Taiwanese patent application.
Feb. 10, 2011 European search report in connection with counterpart European patent application No. 08 73 9944.

* cited by examiner

Radius (mm)

Accumulated operation time of spin coater (second)

Accumulated operation time of spin coater (second)

Radius (mm)

SPIN COATER, TEMPERATURE CONTROLLING METHOD OF THE SAME, OPTICAL DISC PRODUCTION APPARATUS, AND OPTICAL DISC PRODUCTION METHOD

TECHNICAL FIELD

The present invention related to a spin coater capable of efficient formation of cover layers etc. (hereinafter, may be referred to as "transparent protective layer," "transparent resin layer" or "resin layer") with uniform thickness for Blu-ray discs, a method for controlling the temperature of the spin coater, an optical disc production apparatus using the spin coater and a method for producing an optical disc using the spin coater.

In recent years, the data volume has increased with the spread of broadband and digital high-vision broadcasting, and there has been a growing demand for an optical recording system capable of recording and reproducing data with high-density at high-speed. By way of example, the Blu-ray disc standard has been proposed that uses a blue laser having a wavelength of 405 nm and an optical system having a numerical aperture (NA) of 0.85, and Blu-ray products that meet the Blu-ray disc standard have been already commercialized.

In order to secure a tilt margin in a high NA optical system, the Blu-ray disc standard is so designed that a recording beam and reproduction beam are applied by passing through a cover layer having a thickness of around 0.1 mm, in contrast to a conventional method where such beams are applied from a substrate side.

As a method for forming such a cover layer for Blu-ray discs, for example, a spin coating method is used in which a ultraviolet-curable resin composition is applied over the surface of a recording layer by spin coating to form a cover layer. For example, methods are proposed in which the center opening of a disc substrate is filled up and an ultraviolet-curable resin composition is dripped onto the rotational center of the disc substrate (see Patent Literatures 1 to 9).

The above-noted method that involves dripping an ultraviolet-curable resin composition onto the rotational center of a disc substrate requires a step of filling up the center opening of the disc substrate with accuracy. Dripping an ultraviolet-curable resin composition onto a disc substrate at almost the center thereof requires highly accurate positioning, which poses a problem of increased costs for the spin coater.

To solve the problem, a method is conceivable in which instead of a method of dripping an ultraviolet-curable resin composition onto the rotational center of a disc substrate, an ultraviolet-curable resin composition is dripped in a circular pattern around the center opening of the disc substrate, and the dripped ultraviolet-curable resin composition is spread over the disc substrate surface by applying heat to the ultraviolet-curable resin composition to improve its malleability, thereby forming a cover layer with a uniform thickness.

In this case, however, a spin cup that is provided to the spin coater so as to surround the outer circumference of the disc substrate will also be heated. When the next spin coating process is performed before the spin cup is completely cooled (i.e., before the heat of the spin cup dissipates) in order to shorten the overall process time, the reaching temperature of the spin cup, which increases when the ultraviolet-curable resin composition spreads, increases with increasing number of spin coating (heating) processes. After a considerable number of spin coating processes, the temperature of the spin coater is stabilized at a certain temperature. The reaching temperature of the spin cup upon spreading affects the temperature (malleability) of the ultraviolet-curable resin composition. The reaching temperature of the spin cup increases with increasing number of the spin coating processes, so too does the temperature of the ultraviolet-curable resin composition with increasing number of the spin coating processes.

As a result, cover layers have different thicknesses in each spin coating process until the reaching temperature of the spin cup in each spin coating processes is stabilized. For this reason, it has been required in the art to conduct a considerable number of unproductive spin coating processes (i.e., spin coating processes that cannot provide sufficient layer thickness) before the reaching temperature of the spin cup in each spin coating processes is stabilized.

Patent Literature 1: Japanese Patent Application Laid-Open (JP-A) No. 10-320850
Patent Literature 2: Japanese Patent Application Laid-Open (JP-A) No. 10-249264
Patent Literature 3: Japanese Patent Application Laid-Open (JP-A) No. 10-289489
Patent Literature 4: Japanese Patent Application Laid-Open (JP-A) No. 11-195250
Patent Literature 5: Japanese Patent Application Laid-Open (JP-A) No. 11-195251
Patent Literature 6: Japanese Patent Application Laid-Open (JP-A) No. 11-213495
Patent Literature 7: Japanese Patent Application Laid-Open (JP-A) No. 2001-351275
Patent Literature 8: Japanese Patent (JP-B) No. 3695109
Patent Literature 9: Japanese Patent Application Laid-Open (JP-A) No. 2002-319192

DISCLOSURE OF INVENTION

The present invention aims to provide a spin coater that is capable of making the reaching temperature of a spin cup in each spin coating process constant, which temperature increases by means of a heating unit upon spreading of a ultraviolet-curable resin composition in each spin coating process, of stabilizing the temperature of an ultraviolet-curable resin composition upon spreading in each spin coating process in short time, and of spreading the ultraviolet-curable resin composition over the surface of a disc substrate in a uniform thickness over multiple spin coating processes without having to conduct large numbers of unproductive spin coating processes. The present invention also provides a method for controlling the temperature of the spin coater, an optical disc production apparatus using the spin coater, and a method for producing an optical disc using the spin coater.

Means to solve the above-noted problems are as follows.

<1> A spin coater including: a rotation table that rotatably holds a disc substrate, a spin-cup that surrounds the outer circumference of the disc substrate held on the rotation table, a dripping unit configured to drip an ultraviolet-curable resin composition onto a surface of the disc substrate, a rotating unit configured to rotate the disc substrate via the rotation table to spread the ultraviolet-curable resin composition over the surface of the disc substrate, a heating unit configured to heat the ultraviolet-curable resin composition on the disc substrate, and a temperature controlling unit configured to control a reaching temperature of the spin cup which is increased by the heating unit each time the ultraviolet-curable resin composition is spread so as to be constant over multiple spin coating processes.

In the spin coater according to the item <1>, by providing with the temperature controlling unit, in the multiple spin coating processes, the reaching temperature of the spin cup that is increased by the heating unit upon each spreading becomes constant. For this reason, the temperature of the ultraviolet-curable resin composition each time it is spread can be stabilized in short time or with a small number of spin coating processes (i.e., the temperature of the ultraviolet-curable resin composition will not change in each spin coating process). Thus, the spin coater makes it possible, over multiple spin coating processes, to spread the ultraviolet-curable resin composition over the surface of the disc substrate with a uniform thickness without having to perform large numbers of unproductive spin coating processes.

<2> The spin coater according to <1>, wherein the dripping unit is configured to drip the ultraviolet-curable resin composition in a circular pattern around the periphery of a round opening formed in the center of the disc substrate that is rotating by rotation of the rotating unit.

<3> The spin coater according to any one of <1> and <2>, wherein the temperature controlling unit has a flow passage formed in the spin cup and a supplying unit configured to supply a medium to the flow passage.

<4> The spin coater according to <3>, wherein the spin cup has a main body provided with the flow passage on the surface thereof, and a heat-insulating cover for covering the flow passage.

In the spin coater according to any one of <3> and <4>, over multiple spin coating processes, a reaching temperature of the spin cup that is increased by the heating unit upon each spreading can be controlled to be constant by using the flow passage, the supplying unit and the heat-insulating cover as a temperature controlling unit.

<5> The spin coater according to any one of <3> to <4>, wherein the temperature controlling unit comprises: a temperature detecting unit configured to detect the temperature of the spin cup, and a temperature adjusting unit configured to perform feedback control of the temperature of the medium based on the detected spin cup temperature.

Since the spin coater according to <5> has a temperature detecting unit configured to detect the temperature of the spin cup and a temperature adjusting unit configured to feed back and control the temperature of the medium based on the detected spin cup temperature, the spin coater makes it possible to stabilize a reaching temperature of the spin cup from the start time of the spin-coating processes, to make the layer thickness of resin layers uniform, and to prevent occurrence of defective products.

<6> The spin coater according to any one of <1> to <5>, further including: a sucking unit configured to suck air in the spin cup to discharge the air from the spin cup during a time interval from the finish of each spin coating process to the start of the next spin coating process.

<7> The spin coater according to <6>, wherein the sucking unit has a sucking port facing an opening formed on the top surface of the spin cup.

The spin coater according to any one of <6> and <7> makes it possible to reduce variations in peak temperature and in declined temperature and to achieve stabilization of the layer thickness of resin layers by forcedly discharging the air in a spin cup during a time interval from the end time of each spin coating process to the start time of the next spin coating process through the use of the sucking unit.

<8> A method for controlling the temperature of a spin coater having a spin cup that surrounds the outer circumference of a disc substrate held on a rotation table, the method including: spreading an ultraviolet-curable resin composition which has been dripped onto a surface of the disc substrate over the surface the disc substrate while heating the ultraviolet-curable resin composition, the ultraviolet-curable resin composition, and controlling a reaching temperature of the spin cup which is increased by a heating unit each time the ultraviolet-curable resin composition is spread, so as to be constant over multiple spin coating processes.

In the method according to <8>, over multiple spin coating processes, a reaching temperature of a spin cup that is increased by a heating unit upon each spreading can be controlled to be constant in the temperature controlling step. With the use of the method, a reaching temperature of the spin cup that is increased by the heating unit in each spreading time can be controlled constant, the temperature of an ultraviolet-curable resin composition in each spreading time can be stabilized in short time, and the ultraviolet-curable resin composition can be spread over the surface of a disc substrate with a uniform thickness without having to performing large numbers of unproductive spin coating processes in the multiple spin coating processes.

<9> The method according to <8>, wherein the spreading step comprises: dripping the ultraviolet-curable resin composition onto the disc substrate, forming a resin layer composed of the ultraviolet-curable resin composition on the surface of the disc substrate by rotating the ultraviolet-curable resin composition on the disc substrate while heating the ultraviolet-curable resin composition, and shaking off an excessive portion of the ultraviolet-curable resin composition by rotating the resin layer formed on the disc substrate.

<10> The method according to any one of <8> to <9>, wherein the reaching temperature of the spin cup is controlled so as to be constant by supplying a medium to a flow passage formed in the spin cup.

<11> The method according to any one of <8> to <10>, further including sucking air in the spin cup to discharge the air from the spin cup during a time interval from the finish of each spin coating process to the start of the next spin coating process.

<12> An optical disc production apparatus including: the spin coater according to any one of <1> to <7>, wherein a cover layer is formed using the spin coater.

The optical disc production apparatus according to the item <12> allows for efficiently forming cover layers with a uniform thickness through the use of the spin coater of the present invention and also allows for producing an optical disc such as a high-quality Blu-ray disc.

<13> A method for producing an optical disc, including: forming a cover layer using a spin coater according to any one of <1> to <7>.

The method for producing an optical disc according to the item <13> makes it possible to efficiently forming cover layers with a uniform thickness through the use of the spin coater of the present invention and also to produce an optical disc such as a high-quality Blu-ray disc.

The present invention provide a spin coater that can solve the above problems pertinent in the art and that is capable of making the reaching temperature of a spin cup which is increased by means of a heating unit upon spreading of the ultraviolet-curable resin composition in each spin coating process, so as to be constant over multiple spin coating processes, of stabilizing the temperature of a ultraviolet-curable resin composition upon spreading in each spin coating process in short time, and of spreading the ultraviolet-curable resin composition over the surface of a disc substrate in a uniform thickness over multiple spin coating processes without having to conduct large numbers of unproductive spin coating processes. The present invention also provides a method for controlling the temperature of the spin coater, an optical disc production apparatus using the spin coater and a method for producing an optical disc using the spin coater.

BRIEF DESCRIPTION OF DRAWING

FIG. 13 bottom view is the same as FIG. 12.

BEST MODE FOR CARRYING OUT THE INVENTION

Figure 1A:
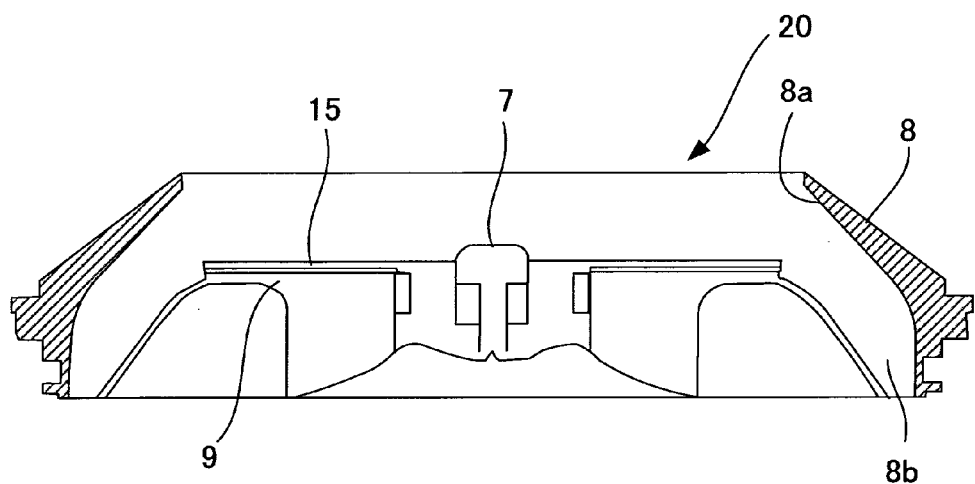
FIG. 1A is a schematic view showing one example of a spin cup used in a conventional spin coater.

Spin Coater and Method for Controlling Temperature of Spin Coater

The spin coater of the present invention has a rotation table, a spin cup, a dripping unit, a rotating unit, a heating unit and a temperature controlling unit and further has other units in accordance with the necessity.

The method for controlling the temperature of a spin coater includes a spreading step, a temperature controlling step and further includes other steps in accordance with the necessity.

The spreading step is a step of spreading an ultraviolet-curable resin composition dripped onto the disc substrate over the surface of the disc substrate while heating the ultraviolet-curable resin composition, and the spreading step preferably includes a dripping step, a resin layer forming step and a shaking-off step.

The method of the present invention for controlling the temperature of a spin coater can be preferably carried out through the use of the spin coater of the present invention, the dripping step can be carried out through the use of the dripping unit, the temperature controlling step can be carried out through the use of the temperature controlling unit, and other steps can be carried out through the use of the other units.

Hereinafter, the spin coater of the present invention and the method of the present invention for controlling the temperature of a spin coater will be described in detail.

—Disc Substrate—

The disc substrate is not particularly limited as to the shape, size, material and the like and may be suitably selected in accordance with the intended use. For the shape and size, for example, a disc substrate formed so as to have an appropriate shape, size, thickness and groove shape that are compliant with the optical disc standard can be used.

Examples of the material of the disc substrate include glass, ceramics, and resins. Of these, resins are preferable in terms of formability and cost.

Examples of the resins include polycarbonate resins, acrylic resins, epoxy resins, polystyrene resins, acrylonitrile-styrene copolymers, polyethylene resins, polypropylene resins, silicone resins, fluorine resins, ABS resins and urethane resins. Of these, polycarbonate resins and acrylic resins are particularly preferable in terms of excellence in formability, optical properties and cost.

—Rotation Table—

The rotation table is a rotatable stage on which the disc substrate is placed when spin coating processes are performed, and which rotates, by the power of a rotating unit, about an axis in the perpendicular direction with respect to the surface thereof on which the disc substrate is placed. The center of the rotation is arranged so that it corresponds to the center of the disc substrate fixed on the rotation table.

The disc substrate is so positioned that the center opening thereof is fitted into a center pin, positioned at and fixed to the rotation table. Alternatively, the substrate disc may be fixed to the rotation table by suction by means of a vacuum device. The disc substrate is fixed to the rotation table and thus rotates together with the rotation table.

—Spin Cup—

The spin cup is a cup-shaped member for surrounding the outer circumference of the disc substrate held on the rotation table.

The spin cup is provided with a temperature controlling unit to be described later. The spin cup preferably has a cup-shaped main body provided with a flow passage on the surface thereof, and a heat-insulating cover for covering the flow passage.

—Rotating Unit—

The rotating unit is a unit for rotating the disc substrate via the rotation table to spread the ultraviolet-curable resin composition over the surface of the disc substrate, and for example, a driving motor is exemplified.

—Dripping Step and Dripping Unit—

The dripping step is a step of dripping an ultraviolet-curable resin onto the surface of the disc substrate and is preferably carried out by using a dripping unit.

The dripping unit is a unit configured to drip an ultraviolet-curable resin composition in a circular pattern around the periphery of the round opening formed in the center of the disc substrate while rotating the disc substrate held on the rotation table at a first rotation speed, and for example, a combination of a nozzle, an arm, a pump and a storage container is exemplified.

For the position onto which the ultraviolet-curable resin composition is dripped is the periphery of the round opening formed at the center of the disc substrate, and the ultraviolet-curable resin composition is dripped in a circular pattern around the periphery of the round opening. The dripping unit is preferably movable and is capable of changing the dripping position as needed, and is preferably capable of being retracted when the dripping unit is out of use. Only one dripping unit or two or more dripping units may be used.

The dripped amount of the ultraviolet-curable resin composition is not particularly limited and may be suitably adjusted in accordance with the intended use. For example, when a cover layer for a Blu-ray disc is to be formed, the dripped amount can be adjusted such that the cover layer finally has a thickness of 0.1 mm.

The first rotation speed is not particularly limited and may be suitably selected in accordance with the intended use, however, it is preferably 50 rpm to 100 rpm.

The ultraviolet-curable resin composition contains at least an ultraviolet-curable resin, a reactive diluent and a photopolymerization initiator, and further contains other components in accordance with the necessity.

Note that it is possible to use a material that is curable by a variety of radiations including lights (including visible light, ultraviolet ray and infrared ray), electromagnetic waves (regardless of the wavelength), X-rays, electron beams and further including oscillatory waves such as supersonic wave, however, ultraviolet-curable resin compositions are preferably used from the perspective of their high-speed curability and high energy conservation.

The ultraviolet-curable resin is not particularly limited and may be suitably selected in accordance with the intended use. For example, it is possible to employ acrylate resins such as urethane (meth)acrylate, epoxy (meth)acrylate and polyester (meth)acrylate. Of these, epoxy (meth)acrylate has a function of improving the hardness of a cured material and accelerate the curing speed, and thus it is preferable to use epoxy (meth)acrylate in combination with at least any one of urethane (meth)acrylate and polyester (meth)acrylate.

The reactive diluent is not particularly limited and may be suitably selected in accordance with the intended use. For example, a (meth)acrylate compound having at least one (meth)acryloyl group in one molecule is exemplified. For the components, any one of a monofunctional compound having only one (meth)acryloyl group and a polyfunctional compound having two or more (meth)acryloyl groups may be used. These reactive diluents may be used at an appropriate ratio for the purposes of adjusting viscosity and reactivity of the used resin or controlling physical properties of the cured material such as elastic modulus and glass transition temperature.

The photopolymerization initiator is not particularly limited and may be suitably selected in accordance with the intended use. Examples thereof include 1-hydroxy-cyclohexyl-phenylketone, 2-hydroxy-2-methyl-1-phenyl-propane-1-one, 2,2-dimethoxy-1,2-diphenylethane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]-phenyl}-2-methyl-propane-1-one, 2-methyl-[4-(methylthio) phenyl]-2-morpholino-1-propanone, 2-chlorothioxanthone, 2,4-dimethylthioxanthone, 2,4-diisopropylthioxanthone, isopropylthioxanthone, phenyl glyoxylic acid methyl ester, bis(2,4,6-trimethylbenzoyl)-phenylphosphine oxide, 2-benzyl-2-dimethylamino-1-(4-morpholinophenyl)-butanone-1,2-dimethylamino-2-(4-methyl-benzyl)-1-(4-morpholine-4-yl-phenyl)-butane-1-one, and 2,4,6-trimethylbenzoyl-diphenyl-phosphine oxide. Each of these photopolymerization initiators may be used alone or in combination with two or more.

—Heating Unit—

The heating unit is a unit for heating an ultraviolet-curable resin composition on the disc substrate.

In heating of the ultraviolet-curable resin composition by the heating unit, it is preferable that the dripping of the ultraviolet-curable resin composition by means of the dripping unit be stopped, the heating unit be moved over the disc substrate, and the ultraviolet-curable resin composition dripped onto the disc substrate be heated by the heating unit.

The heating unit is not particularly limited as long as it can heat an ultraviolet-curable resin composition on the disc substrate, and may be suitably selected in accordance with the intended use. Examples thereof include a heating unit having two or three IR lamps, and a hot-air blowing heater.

The heating unit is preferably movable and is capable of changing the heating position as needed, and is preferably capable of being retracted when the heating unit is out of use. Only one heating unit or two or more heating units may be used.

The heating temperature differs depending on the ultraviolet-curable resin composition to be used and may be changed as needed, however, it is preferably 200° C. to 500° C.

—Resin Layer Forming Step—

The resin layer forming step is a step of forming a resin layer composed of an ultraviolet-curable resin composition on the disc substrate by rotating the ultraviolet-curable resin composition on the disc substrate while heating the ultraviolet-curable resin composition, and it is preferable that a resin layer composed of an ultraviolet-curable resin composition be formed on the disc substrate by rotating the ultraviolet-curable resin composition on the disc substrate at a second rotation speed that is faster than the first rotation speed while heating the ultraviolet-curable resin composition.

The second rotation speed is not particularly limited as long as it is faster than the first rotation speed, and may be suitably selected in accordance with the intended use. However, the second rotation speed is preferably 100 rpm to 200 rpm.

—Shaking-Off Step—

The shaking-off step is a step of shaking off an excessive ultraviolet-curable resin composition by rotating the resin layer formed on the disc substrate, and it is preferable that heating of the ultraviolet-curable resin composition by means of the heating unit be stopped, then the heating unit be moved outside the disc substrate, and the excessive ultraviolet-curable resin composition be shaken off by rotating the resin layer formed on the disc substrate at a third rotation speed that is faster than the second rotation speed.

The third rotation speed is not particularly limited as long as it is faster than the second rotation speed, and may be suitably selected in accordance with the intended use. The third rotation speed is preferably 800 rpm to 1,500 rpm.

—Temperature Controlling Step and Temperature Controlling Unit—

The temperature controlling step is a step of controlling the reaching temperature of the spin cup so as to be constant over multiple spin coating processes, which temperature increases by the heating unit each time the ultraviolet-curable resin composition is spread in the spin coating process. The temperature controlling step is preferably carried out by a temperature controlling unit.

The temperature controlling method is not particularly limited and may be suitably selected in accordance with the intended use; however, for example, (1) a method of cooling the spin cup so as to maintain the temperature the spin cup at the start time, or (2) a method of maintaining the saturated temperature of the spin cup can be used.

The temperature controlling unit is not particularly limited as long as it can control the reaching temperature of the spin cup so as to be constant over multiple spin coating processes, which temperature increases by the heating unit each time the ultraviolet-curable resin composition is spread in the spin coating processes, and may be suitably selected in accordance with the intended use. For example, a temperature controlling unit having a flow passage in a spin cup and a supplying unit configured to supply a medium to the flow passage is preferable. It is more preferable that the spin cup have a main body provided with a flow passage on the surface thereof and a heat-insulating cover for covering the flow passage.

Specific examples of the temperature controlling unit are as follows: (i) a heat controlling unit in which a flow passage through which a medium circulates is a tube and the tube is provided in a spiral form on the main body of a spin cup, (ii) a heat controlling unit in which a flow passage through which a medium circulates is a tube and the tube is buried in a spiral form in the main body of a spin cup, and (iii) a temperature controlling unit in which a flow passage through which a medium circulates is a jacket covering the main body of a spin cup and the medium circulates through the jacket.

The tubes used in the temperature controlling units (i) to (iii) are not particularly limited as to the size, shape, material and the like, and may be suitably selected in accordance with the intended use. However, for example, a metal tube made of stainless steal (SUS), Cu, Al or the like is preferable.

The tube used in the temperature controlling unit (i) is preferably covered with a heat-insulating material. Examples of the heat-insulating material include polypropylene foams and urethane foams.

The temperature controlling unit (ii) may be designed so that the spin cup main body is formed in a thick structure and the tube is embedded in the spin cup main body and may also be designed so that a cooling groove is formed in the spin cup main body and the spin cup main body is sealed by brazing or with O-ring.

Examples of the medium used in the temperature controlling units (i) to (iii) include water, air, ethylene glycols and oils. Of these, water is referable. The water may be cooling water or hot water.

Further, the temperature controlling unit preferably has a detecting unit configured to detect the temperature of the spin cup and a temperature adjusting unit configured to perform feedback control of the medium temperature based on the detected spin cup temperature. With this configuration, by performing feedback control of the medium temperature, it is possible to adjust the temperature of the spin cup to an optimum temperature from the beginning of the operation of the spin coater and thus to make uniform the thicknesses of resin layers composed of the ultraviolet-curable resin composition.

The temperature adjusting unit is not particularly limited and may be suitably selected in accordance with the intended use. Examples thereof include a die temperature adjusting device commonly used in an injection molding machine.

Further, the temperature controlling unit preferably has a sucking unit configured to vacuum air in the spin cup to discharge the air from the spin cup during a time interval from the finish of each spin coating process to the start of the next spin coating process.

The sucking unit is not particularly limited as long as it can speedily discharge heated air in the spin cup, and may be suitably selected in accordance with the intended use. Examples of such a sucking unit include blowers, sirocco fans, and turbofans. For the sucking unit, it is preferable to use a sucking unit having a sucking port facing an opening formed on the top surface of the spin cup. The sucking unit is preferably movable and is capable of changing the sucking position as needed, and is preferably capable of being retracted when the sucking unit is out of use. Only one sucking unit or two or more sucking units may be used.

Here, FIG. 1A is a schematic view showing one example of a spin cup commonly used in a conventional spin coater.

A disc substrate 15 is a substrate on which spin coating processes are performed, serving as a substrate designed for optical disc production and has a disc-like shape having an opening at the center thereof. A rotation table 9 is a stage on which the disc substrate 15 is placed when spin coating processes are performed, and which rotates, by the power of a rotation driving motor (not shown), about an axis in the perpendicular direction with respect to the surface of the rotation table 9 on which the disc substrate 15 is placed. The center of the rotation is arranged so as to correspond to the center of the disc substrate 15 fixed on the rotation table 9.

A center pin 7 is fitted into the opening of the disc substrate 15 so as to fill up the opening. The center pin 7 is provided for the purposes of positioning of the disc substrate 15 and fixing the disc substrate 15 to the rotation table 9 or the like. The substrate disc 15 may be attached by suction to the rotation table 9 using a vacuum device. By fixing the disc substrate 15 to the rotation table 9, the disc substrate 15 rotates together with the rotation table 9.

In FIG. 1A, reference numeral 8 indicates a spin cup main body structured so as to surround the outer circumference of the disc substrate 15 fixed on the rotation table 9. The spin cup main body 8 is equipped with an inner wall 8a that has an inner circumference greater in length than the outer circumference of the disc substrate 15 when the disc substrate 15 is fixed on the rotation table 9. The inner wall 8a is a wall for catching an ultraviolet-curable resin composition spread outwardly by rotation. Reference numeral 8b indicates a resin receiver or a dent for collecting an ultraviolet-curable resin composition that flows inside the spin cup main body 8. The resin receiver 8b can efficiently collect an ultraviolet-curable resin composition by utilizing a centrifugal force at the time of coating.

Figure 2:
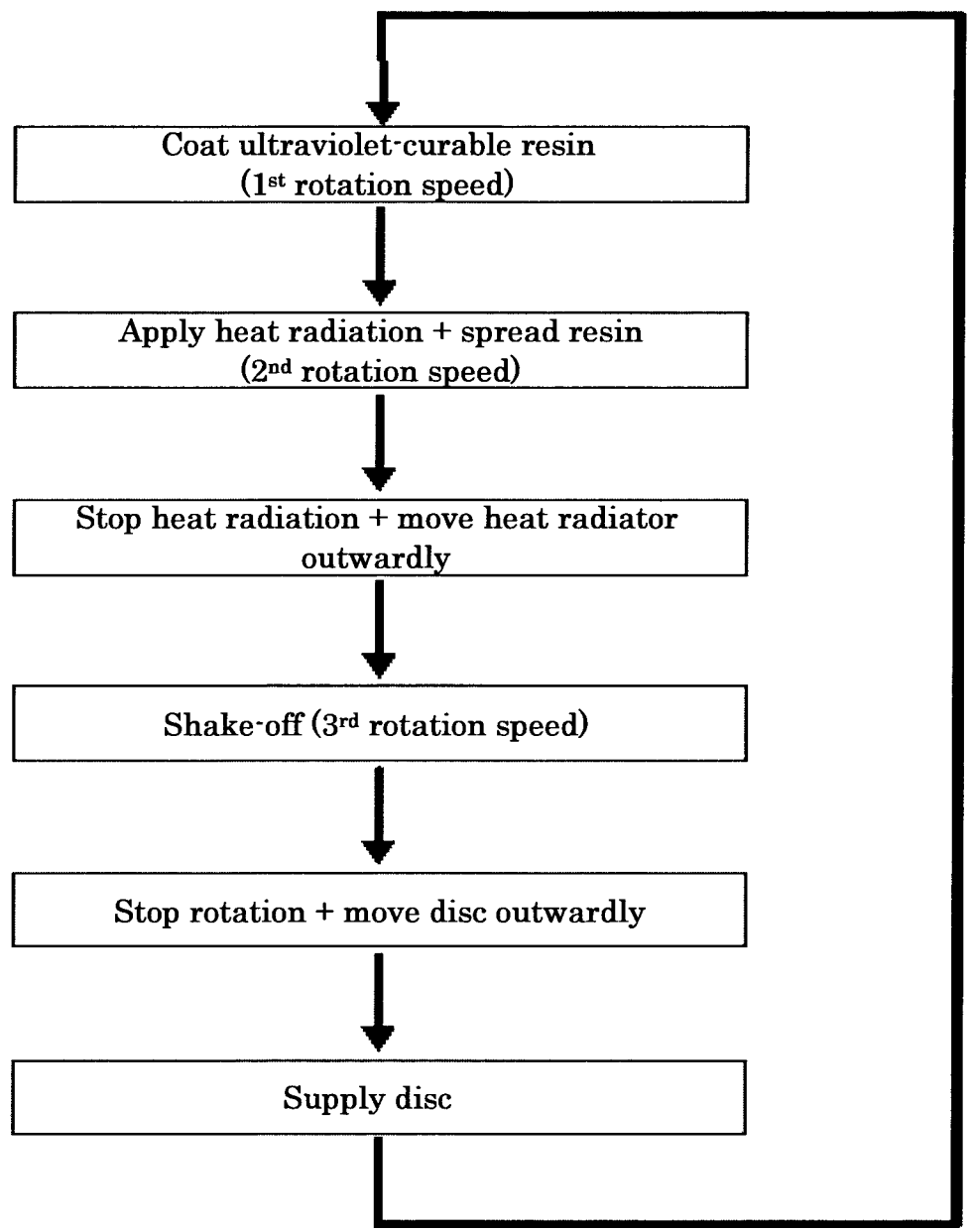
FIG. 2 is a flow diagram of a production process using the spin coater of the present invention.

When optical discs are successively produced using the spin coater equipped with a spin cup 20 shown in FIG. 1A according to the production process flow shown in FIG. 2, the temperature of the spin cup 20 at the start time of the operation of the spin coater is room temperature (24° C. to 25° C.). However, after 10 minutes from the start of operation, the temperature of the spin cut reaches 45° C. and then stabilized. Until the reaching temperature of the spin cup 20 is stabilized, the thickness of the resin layer composed of the ultraviolet-curable resin composition continuously varies, and thus the optical discs obtained during that period cannot be used as a product.

Figure 1B:
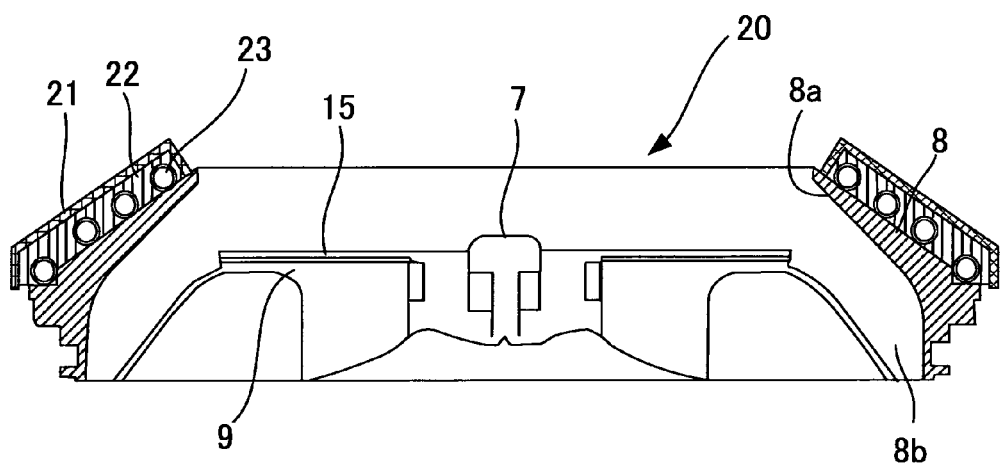
FIG. 1B is a schematic view showing one example of a spin cup in a spin coater according to the present invention.

A spin cup 20 shown in FIG. 1B is provided with a metal tube 23, which is made of stainless steal (SUS), Cu, Al etc. as a temperature controlling unit, in a spiral form on a spin cup main body 8 of the spin cup as shown in FIG. 1A. The metal tube 23 is covered with a heat-insulating material 22, and a cover 21 is formed on the heat-insulating material 22. Other configurations of the spin cup 20 are identical to those of the spin cup shown in FIG. 1A.

The spin cup 20 shown in FIG. 1B can prevent the temperature of the spin cup 20 from increasing, can prevent the temperature of the spin cup 20 from reaching a temperature higher than 35° C. and can bring the reaching temperature of the spin cup to a stable temperature range in short time by circulating cooling water as a medium through the tube 23.

Figure 1C:
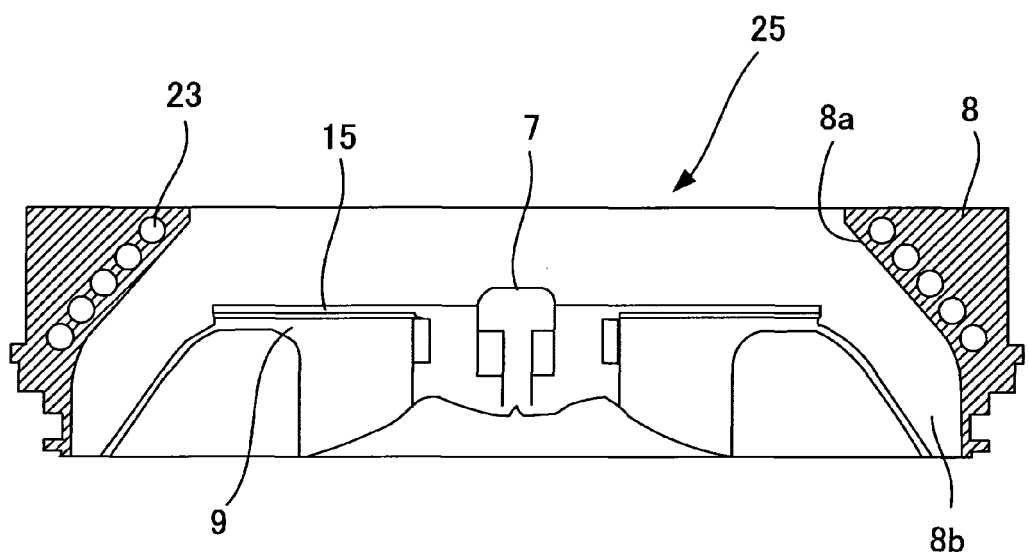
FIG. 1C is a schematic view showing another example of a spin cup in a spin coater according to the present invention.

In a spin cup 25 shown in FIG. 1C, a spin cup main body 8 of the spin cup as shown in FIG. 1A is formed in a thick structure, a metal tube 23 that is made of stainless steal (SUS), Cu, Al etc. as a temperature controlling unit is embedded in the spin cup main body 8, and other configurations of the spin cup 20 are identical to those of the spin cup shown in FIG. 1A.

The spin cup 25 shown in FIG. 1C can prevent the temperature of the spin cup 20 from increasing, can prevent the temperature of the spin cup 20 from reaching a temperature higher than 35° C., can bring the reaching temperature of the spin cup to a stable temperature range in short time and can control the reaching temperature of the spin cup so as to be constant by circulating cooling water as a medium through the tube 23.

Figure 3A:
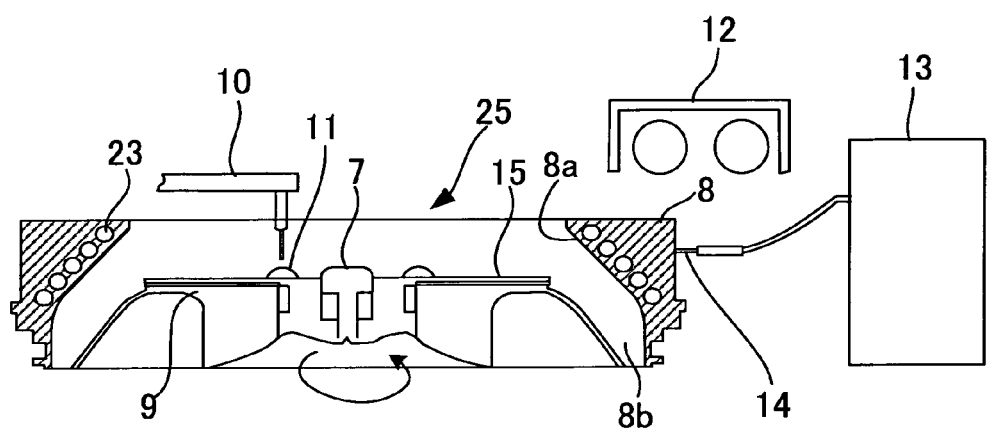
FIG. 3A illustrates a dripping step in a spin coating process using the spin coater of the present invention.
Figure 3B:
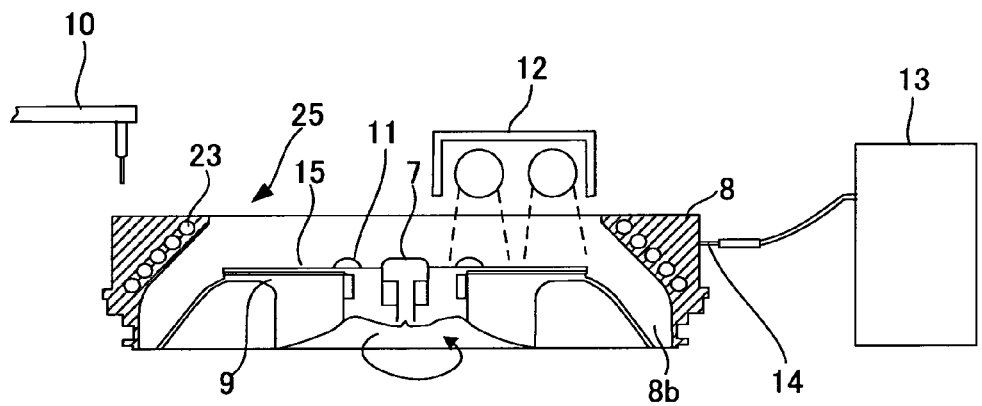
FIG. 3B illustrates a heating step in a spin coating process using the spin coater of the present invention.
Figure 3C:
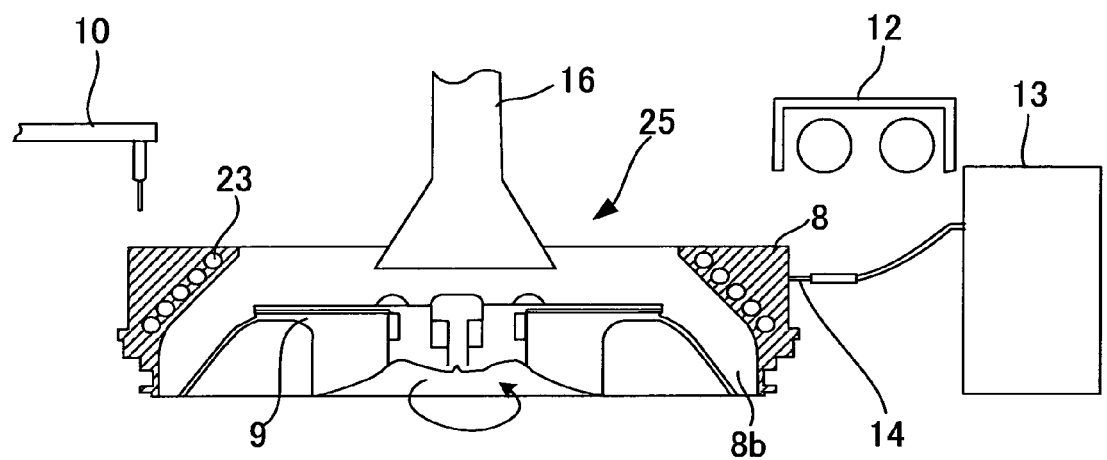
FIG. 3C shows a state where air in the spin cup is sucked out of the spin cup with a blower in a spin coating process using the spin coater of the present invention.

FIGS. 3A to 3C each shows a spin coater equipped with the spin cup 25 shown in FIG. 1C incorporating a temperature controlling unit, and the spin coater is equipped with a rotation table 9, the spin cup 25, a dripping unit 10, a temperature adjusting unit 13, a sucking unit 16 and a heating unit 12.

The spin coater shown in FIGS. 3A to 3C includes on a spin cup main body a flow passage (tube) through which cooling water or heat adjusted water circulates. Thus the spin coaters can control the reaching temperature of the spin cup so as to be constant over multiple spin coating processes, the temperature being increased by the heating unit each time the ultraviolet-curable resin composition is spread. In addition, the temperature in the spin cup that is heated by the heating unit can be reduced to the temperature inside the spin coater by means of the sucking unit.

Hereinafter, the spin coater of the present invention will be further described based on the spin coating process flow diagrams illustrated in FIGS. 3A to 3C and FIG. 4.

First, as shown in FIG. 3A, an ultraviolet-curable resin composition 11 is dripped around the periphery of a round opening formed at the center of the disc substrate 15 while rotating the disc substrate 15 at a first rotation speed, by using a nozzle 10 as a dripping unit (dripping step).

Dripping of the ultraviolet-curable resin composition 11 through the use of the nozzle 10 as a dripping unit is stopped, and then the heating unit 12 is moved over the disc substrate 15.

Next, as shown in FIG. 3B, heat is applied to the ultraviolet-curable resin composition 11 on the disc substrate 15 from the heating unit 12.

A resin layer composed of the ultraviolet-curable resin composition 11 is spread over the surface of the disc substrate 15 by rotating the disc substrate 15 at a second rotation speed faster than the first rotation speed while radiating heat to the ultraviolet-curable resin composition 11 on the disc substrate 15 from the heating unit 12 (resin layer forming step).

Next, heating from the heating unit 12 is stopped, and then the heating unit 12 is moved outside the disc substrate 15.

The resin layer composed of the ultraviolet-curable resin composition 11 and formed on the disc substrate 15 is rotated at a third rotation speed faster than the second rotation speed to shake off an excessive amount of the resin composition (shaking-off step). Subsequently, a series of the dripping step to the shaking-off step is repeated. At that time, during the time from the dripping step to the shaking-off step, a temperature controlling step is performed. The temperature controlling step is carried out by a temperature controlling unit. As the temperature controlling unit, the spin coater is equipped with a tube 23 through which a medium capable of cooling or heating the spin cup circulates, the temperature adjusting unit 13 and the sucking unit 16 configured to suck air in the spin cup to discharge the air from the spin cup. By operations of these units, the reaching temperature of the spin cup is made constant over multiple spin coating processes, the temperature being increased by the heating unit each time the ultraviolet-curable resin composition is spread in the spin coating process.

In FIG. 3B, heat is applied to the ultraviolet-curable resin composition 11 from the heating unit 12, and the ultraviolet-curable resin composition 11 is spread over the disc substrate surface while heating the ultraviolet-curable resin composition 11. At this point, the temperature of air in the spin cup 25 instantly increases to 140° C. When heating of the ultraviolet-curable resin composition by the heating unit 12 is stopped, the temperature of the air in the spin cup is rapidly decreased, but is not decreased to the temperature inside the spin coater. For this reason, the temperature of air in the spin cup in the next application of the ultraviolet-curable resin composition 11 over the disc substrate surface varies, and temperature variations adversely affect the uniformity resin layer thickness.

Then, as shown in FIG. 3C, after shaking off an excessive portion of the ultraviolet-curable resin composition, the temperature of air in the spin cup 25 can be controlled to 23° C. to 24° C., a temperature range which is the same level as that inside the spin coater, by forcedly discharging heated air in the spin cup 25 using the sucking unit 16.

When operation of the spin coater is stopped due to certain trouble during the production of optical discs, the reaching temperature of the spin cup increases to 35° C., and the reaching temperature that has been stabilized once is then immediately decreased. Therefore, when the spin coater is started up again, non-defective products cannot be obtained until the reaching temperature of the spin cup is stabilized again. To solve the problem, the following method is effective. That is, warm water (60° C.) is circulated through the tube 23 using the temperature controlling unit 13 shown in FIG. 3C, further, the temperature of the spin cup 25 with a cooling circuit incorporated therein is detected by means of a thermocouple 14, the temperature detected by the thermocouple 14 is fed back to the temperature adjusting unit 13, and the temperature of the medium supplied from the temperature adjusting unit 13 to the tube 23 is controlled. Thereby the reaching temperature of the spin cup can be controlled so as to be constant, and resin layers having a uniform layer thickness can be stably produced.

With the use of a conventional spin coater, to make a state where resin layers have a uniform layer thickness in mass production, there is a need to determine conditions until after the reaching temperature of the spin cup is stabilized or there is a need at a start time of the spin coater to determine conditions after estimating variations in layer thickness of resin layers during the time until a reaching temperature of the spin cup is stabilized. Therefore, it is extremely difficult to determine the conditions. However, by stabilizing a reaching temperature of a spin cup from the initial stage, as described in the spin coater of the present invention, the present invention has an advantage in that conditions are easily determined.

(Optical Disc Production Apparatus and Method for Producing an Optical Disc)

The optical disc production apparatus of the present invention has at least the spin coater of the present invention and further has other units in accordance with the necessity.

A cover layer for an optical disc is formed by using the spin coater.

The other units differ depending on the layer structure of an optical disc to be produced, however, are not particularly limited and may be suitably selected in accordance with the intended use. Examples of the other units include a sputtering device, an ultraviolet illuminator, a disc rotation device, a conveying unit and a controlling unit.

The method for producing an optical disc of the present invention includes at least forming a cover layer using the spin coater of the present invention and further includes other steps in accordance with the necessity.

The other steps differ depending on the layer structure of an optical disc to be produced, however, are not particularly limited and may be suitably selected in accordance with the intended use. Examples of the other steps include a reflective layer forming step, a dielectric layer forming step and a recording layer forming step.

Next, one example of a method of producing a Blu-ray disc will be described below. First, on a polycarbonate substrate having a thickness of 1.1 mm with a guide groove (groove depth: 22 nm) formed on a surface thereof, a reflective layer composed of an Ag alloy having a thickness of 40 nm is formed by sputtering. Next, on the reflective layer, an upper protective layer composed of $ZnS.SiO_2$ (80 mole %:20 mole %) having a thickness of 10 nm is formed by sputtering. Next, on the upper protective layer, a recording layer composed of a phase-changeable material having a thickness of 14 nm is formed by sputtering. Next, on the recording layer, a lower protective layer composed of $ZnS.SiO_2$ (80 mole %:20 mole %) is formed by sputtering.

Then, over the surface of the lower protective layer, an ultraviolet-curable resin composition is applied by the spin coating method of the present invention to form a cover layer having a thickness of 0.1 mm. Thereby an optical recording medium having a total thickness of about 1.2 mm can be produced.

Hereinabove, the spin coater, the method for controlling the temperature of a spin coater, the optical disc production apparatus and the method for producing an optical disc of the present invention has been described in detail, however, the present invention is not limited to the disclosed embodiments, and various changes and modifications may be made without departing from the scope of the invention.

EXAMPLES

Hereinafter, the present invention will be further described with reference to Examples, however, the present invention is not limited to the disclosed Examples.

Comparative Example 1

Resin layers each composed of an ultraviolet-curable resin composition having the following ingredients were successively formed using a spin coater equipped with a spin cup as shown in FIG. 1A according to a production process flow shown in FIG. 2.

—Ingredients of Ultraviolet-Curable Resin Composition—

The ultraviolet-curable resin composition contains at least a radical polymerizable oligomer, a radical polymerizable monomer and a photopolymerization initiator. For the photopolymerization initiator, a compound having an effective absorption wavelength range of 150 nm to 450 nm can be used. For the radical polymerizable oligomer, a urethane (meth)acrylate compound, an epoxy (meth)acrylate compound, an ester (meth)acrylate compound, a polycarbonate compound, a polyacrylate compound, a polyvinyl compound or the like can be used. For the radical polymerizable monomer, a (meth)acrylate compound having at least one (meth)acryloyl group in one molecule etc. can be used. Further, both a monofunctional compound having one (meth)acryloyl group and a polyfunctional compound having two or more (meth)acryloyl groups may be used, and the compounds may be used in combination in appropriate proportions. The ultraviolet-curable resin composition may further contain additives such as organic solvents, silane coupling agents, polymerization inhibitors, surface lubricants, ultraviolet absorbents and fillers.

Specifically, the ultraviolet-curable resin composition was first dripped in a circular pattern around the periphery of a round opening formed at the center of the disc substrate while rotating the disc substrate at a first rotation speed (60 rpm) by actuation of a driving motor.

Next, dripping of the ultraviolet-curable resin composition was stopped, and an IR lamp as a heating unit was moved over the disc substrate to heat the ultraviolet-curable resin composition dripped on the disc substrate to 65° C.

Next, a resin layer composed of the ultraviolet-curable resin composition was formed on the disc substrate by rotating the ultraviolet-curable resin composition dripped onto the disc substrate at a second rotation speed (150 rpm) faster than the first rotation speed while heating the ultraviolet-curable resin composition using the IR lamp.

Next, heating by the IR lamp was stopped, then the IR lamp was moved outside the disc substrate, and the resin layer formed on the disc substrate was rotated at a third rotation speed (1,200 rpm) faster than the second rotation speed to shake off an excessive portion of the ultraviolet-curable resin composition.

In this way a resin layer composed of the ultraviolet-curable resin composition was formed on the disc substrate.

<Evaluation>

Figure 5:
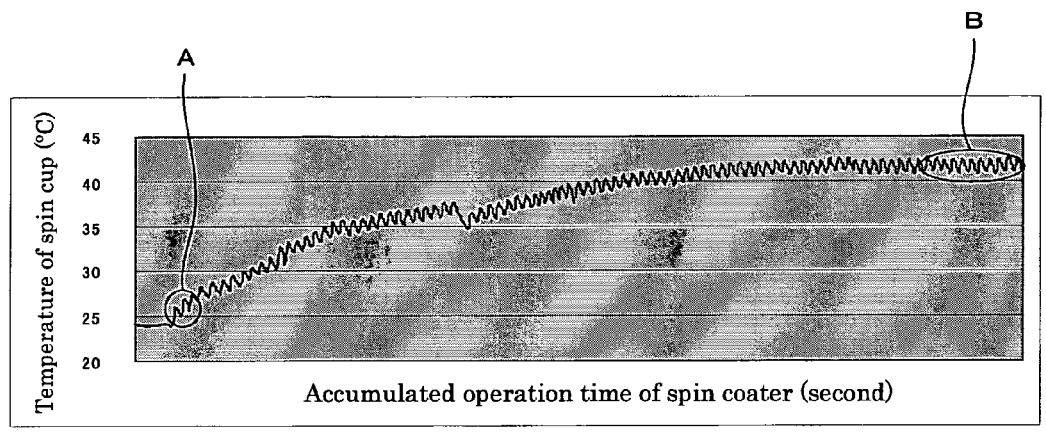
FIG. 5 is a graph showing a relation between an accumulated operation time of the spin coater in Comparative Example 1 and temperature of the spin cup.

FIG. 5 shows a relation between the temperatures of the spin cup and an accumulated operation time of the spin coater during the successive resin layer formation. Each of peak points in FIG. 5 indicates each spin coating process. As shown in FIG. 5, the temperature of the spin cup in each spin coating process is different, and the highest temperature of the spin cup in each spin coating process is a reaching temperature of the spin cup.

Figure 6:
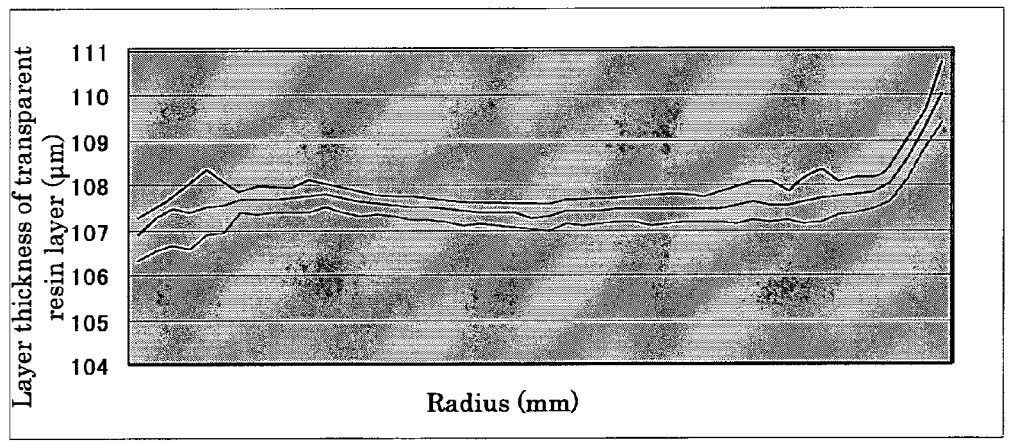
FIG. 6 is a graph showing a layer thickness distribution (in A portion) in a radial direction of the disc substrate at the start time of operation of the spin coater in Comparative Example 1.
Figure 7:
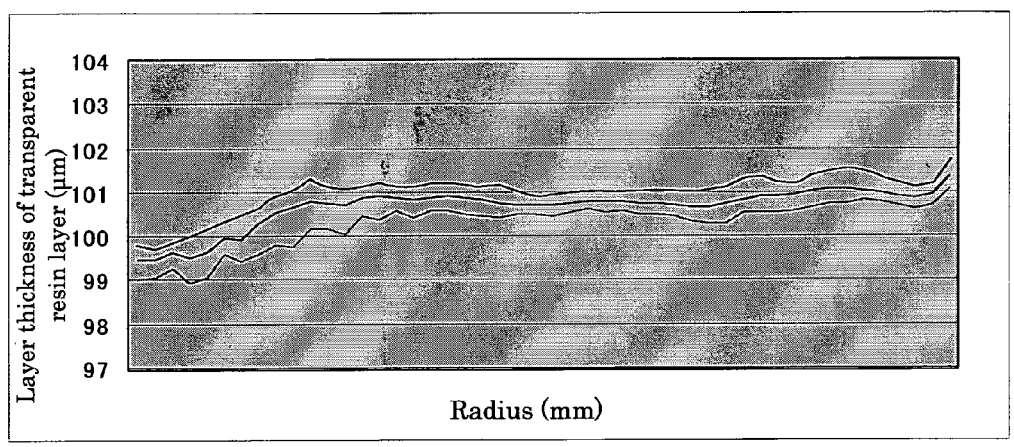
FIG. 7 is a graph showing a layer thickness distribution (in B portion) in a radial direction of the disc substrate during a time when the temperature of the spin cup of Comparative Example 1 was stabilized.

FIG. 6 shows a layer thickness distribution in a radial direction of the disc substrate at the start of the operation of the spin coater, which corresponds to A portion in FIG. 5. FIG. 7 shows a layer thickness distribution in a radial direction of the disc substrate during a time when the reaching temperature of the spin cup was stabilized, which corresponds to B portion in FIG. 5. Note that a plurality of thermocouples was set at a plurality of positions of the spin cup to measure the temperatures of the spin cup continuously. The layer thickness distribution of the resin layers was determined by using MT-200. Blue manufactured by Dr. Schenc Co.

The results shown in FIGS. 5 to 7 indicate that at the start time of operation of the spin coater, the layer thickness of the resin layer was 107 μm when the reaching temperature of the spin cup was 26° C. (room temperature); in 10 minutes after the start time, the temperature of the spin cup increased to around 40° C. and then stabilized, and the layer thickness of the resin layer at that time was 100 μm. Because the layer thickness of the resin layers varied during the period before the reaching temperature of the spin cup was stabilized, there were 60 defective products (in other words, the number of spin coating processes performed before the layer thickness of the resin layers was stabilized was 60).

Whether a resin layer was defective or not was determined as follows. A resin layer having a layer thickness deviating from a predetermined range (in this case, ±2 μm) relative to the layer thickness of the resin layer at a stabilized reaching temperature (in this case, 100 μm) was determined to be defective. The term "the temperature of the spin cup was stabilized" means that the layer thickness of the resin layer was within the predetermined range.

Example 1

Resin layers each composed of an ultraviolet-curable resin composition were successively formed on a disc substrate according to the production process flow shown in FIG. 2 in the same manner as in Comparative Example 1 except that instead of the spin cup 20 shown in FIG. 1A, a spin coater having a spin cup shown in FIG. 1B was used.

The spin cup 20 shown in FIG. 1B is provided with a tube 23 made of stainless steal (SUS) as a temperature controlling unit, in a spiral form on a spin cup main body 8 of the spin cup 20 shown in FIG. 1A. The tube 23 is covered with a heat-insulating material 22, and a cover 21 is covered over the heat-insulating material 22. As a medium circulated through the tube 23, water of 19° C. was used. As a heating unit, an IR lamp was used.
<Evaluation>

Figure 8:
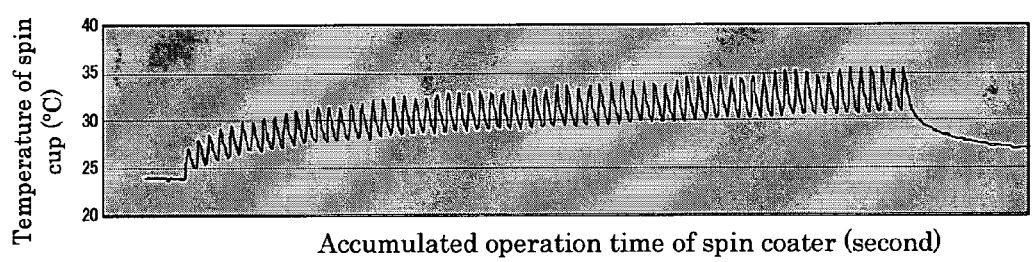
FIG. 8 is a graph showing a relation between an accumulated operation time of the spin coater in Example 1 and temperature of the spin cup.

FIG. 8 shows a relation between an accumulated operation time of the spin coater and temperatures of the spin cup during the successive resin layer formation. Each of peak points in FIG. 8 indicates each spin coating process. As shown in FIG. 8, the temperatures of the spin cup in each time spin coating process is different, and the highest temperature of the spin cup in each time spin coating process is a reaching temperature.

In Example 1, it was found that the reaching temperature of the spin cup at the start time of operation of the spin coater was 27° C., and in 5 minutes after start, the temperature of the spin cup was stabilized at around 35° C. Compared to Comparative Example 1, it was possible in Example 1 to shorten a time interval until the reaching temperature was stabilized and resin layers could be formed with a uniform thickness. During the time when the reaching temperature of the spin cup varied from 27° C. to 35° C., the layer thickness of the resin layers varied, and the number of defectives was 30 (in other words, the number of spin coating processes performed until the layer thickness of the resin layers was stabilized was 30). Compared to Comparative Example 1, the number of defectives could be drastically decreased in Example 1.

Example 2

Resin layers each composed of an ultraviolet-curable resin composition were successively formed on a disc substrate according to the production process flow shown in FIG. 2 in the same manner as in Comparative Example 1 except that instead of the spin cup 20 shown in FIG. 1A, a spin coater having a spin cup 25 shown in FIG. 1C was used.

In the spin cup 25 shown in FIG. 1C, a spin cup main body 8 of the spin cup 20 as shown in FIG. 1A is formed in a thick structure, and a tube 23 made of stainless steal (SUS) as a temperature controlling unit is embedded in a spiral form in the spin cup main body 8. As a medium circulated through the tube 23, water at a temperature of 19° C. was used. As a heating unit, an IR lamp was used.
<Evaluation>

In Example 2, it was found that the reaching temperature of the spin cup at the start time of operation of the spin coater was 26° C., and in 5 minutes after start, the temperature of the spin cup was stabilized at around 35° C. Compared to Comparative Example 1, it was possible in Example 2 to shorten a time interval until the reaching temperature was stabilized and resin layers could be formed with a uniform thickness. During the time when the reaching temperature of the spin cup varied from 26° C. to 35° C., the layer thickness of the resin layers varied, and the number of defectives was 30 defectives products (in other words, the number of spin coating processes performed until the layer thickness of the resin layers was stabilized was 30). Compared to Comparative Example 1, the number of defectives could be drastically decreased in Example 2.

Example 3

Figure 4:
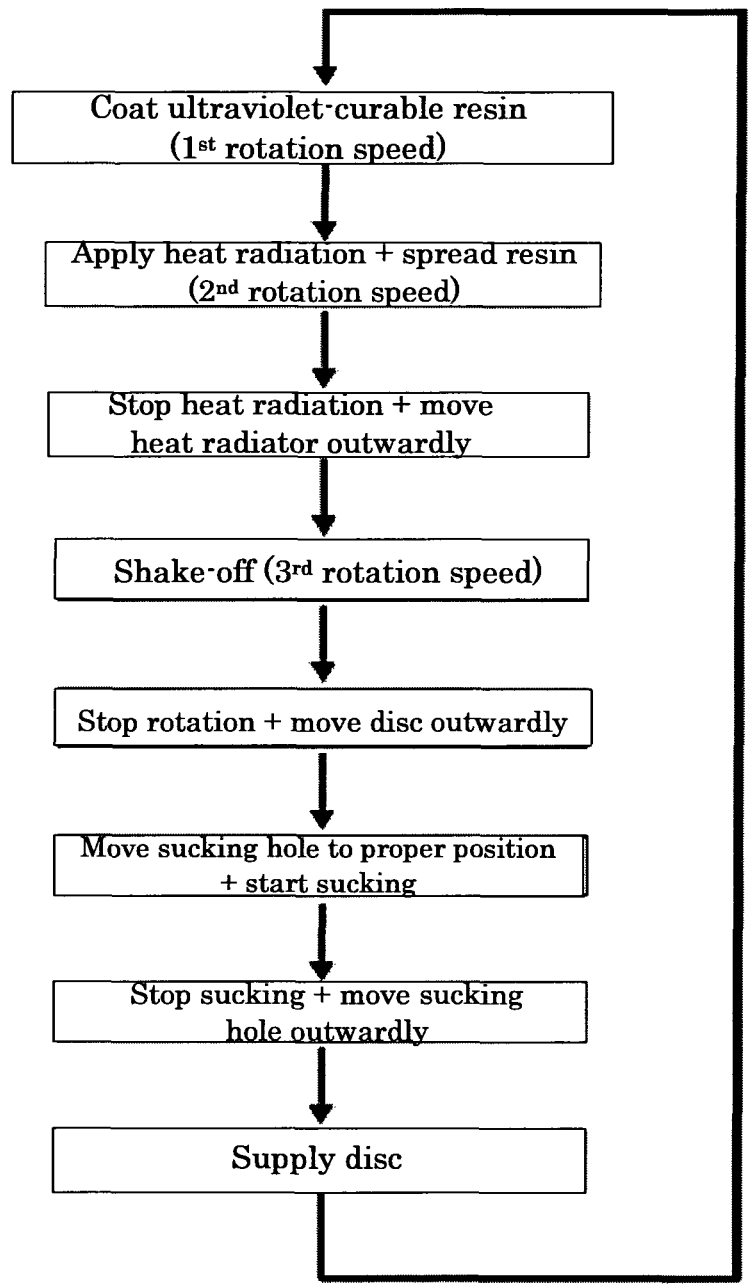
FIG. 4 is a flow diagram of another production process using the spin coater of the present invention.

Resin layers each composed of an ultraviolet-curable resin composition were successively formed on a disc substrate according to the production process flow shown in FIG. 4 (but without feedback control of the medium temperature) in the same manner as in Comparative Example 1 except that instead of the spin cup 20 shown in FIG. 1A, a spin coater having a spin cup 25 shown in FIG. 1C was used.

In the spin cup 25 shown in FIG. 1C, a spin cup main body 8 of the spin cup 20 as shown in FIG. 1A is formed in a thick structure, and a tube 23 made of stainless steal (SUS) as a temperature controlling unit is embedded in a spiral form in the spin cup main body 8. As a medium circulated through the tube 23, water at a temperature of 19° C. was used. As a heating unit, an IR lamp was used, and as a sucking unit, a blower was used.
<Evaluation>

In Example 3, it was found that the reaching temperature of the spin cup at the start time of operation of the spin coater was 26° C., and in 5 minutes after start, the temperature of the spin cup was stabilized at around 35° C. Compared to Comparative Example 1, it was possible in Example 3 to shorten a time interval until the reaching temperature was stabilized and resin layers could be formed with a uniform thickness. During the time when the reaching temperature of the spin cup varied from 26° C. to 35° C., the layer thickness of the resin layers varied, and the number of defectives was 30 (in other words, the number of spin coating processes performed until the layer thickness of the resin layers was stabilized was 30). Compared to Comparative Example 1, the number of defectives could be drastically decreased in Example 3.

Example 4

Resin layers each composed of an ultraviolet-curable resin composition were successively formed on a disc substrate according to the production process flow shown in FIGS. 3A to 3C and FIG. 4 in the same manner as in Comparative Example 1 except that instead of the spin cup shown in FIG. 1A, a spin coater having a spin cup 25 shown in FIG. 1C was used.

In the spin cup 25 shown in FIG. 1C, a spin cup main body 8 of the spin cup 20 as shown in FIG. 1A is formed in a thick structure, and a tube 23 made of stainless steel (SUS) as a temperature controlling unit is embedded in a spiral form in the spin cup main body 8. As a medium circulated through the tube 23, hot water of 60° C. was used.

As a heating unit, an IR lamp was used; as a sucking unit, a blower was used; and as a temperature adjusting device, a die temperature adjusting device commonly used in an injection molding machine was used.

<Evaluation>

Figure 9:
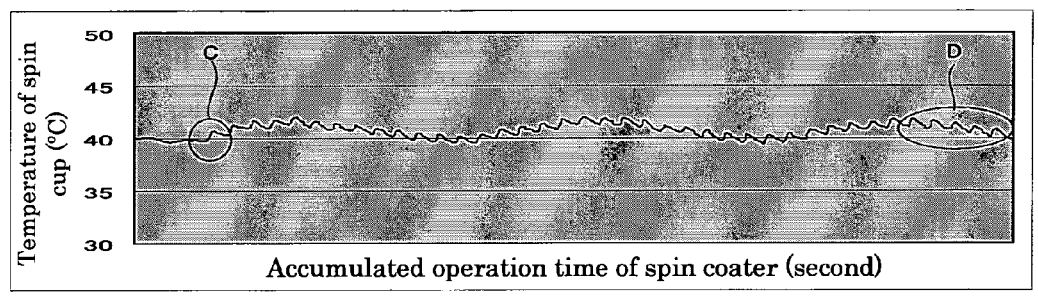
FIG. 9 is a graph showing a relation between an accumulated operation time of the spin coater in Example 4 and temperature of the spin cup.
Figure 10:
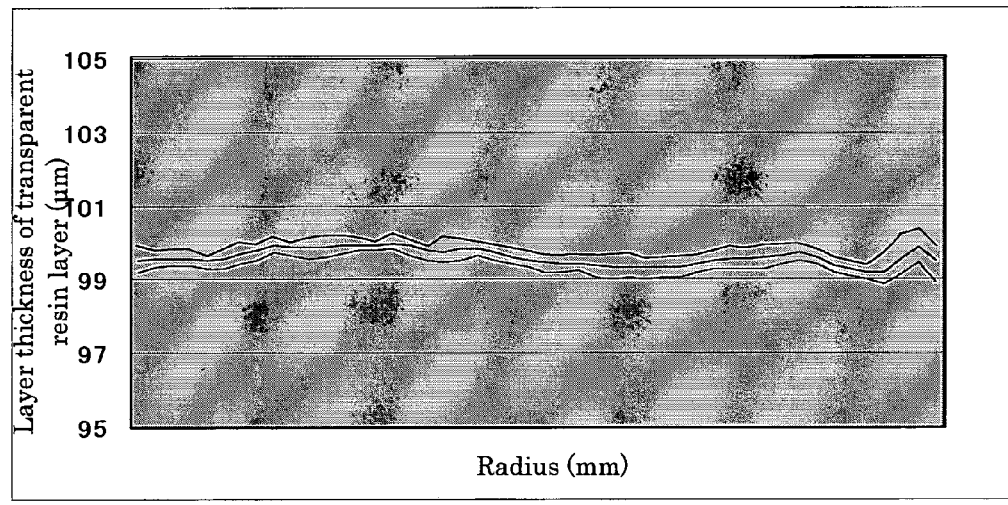
FIG. 10 is a graph showing a layer thickness distribution (in C portion) in a radial direction of the disc substrate at the start time of operation of the spin coater in Example 4.
Figure 11:
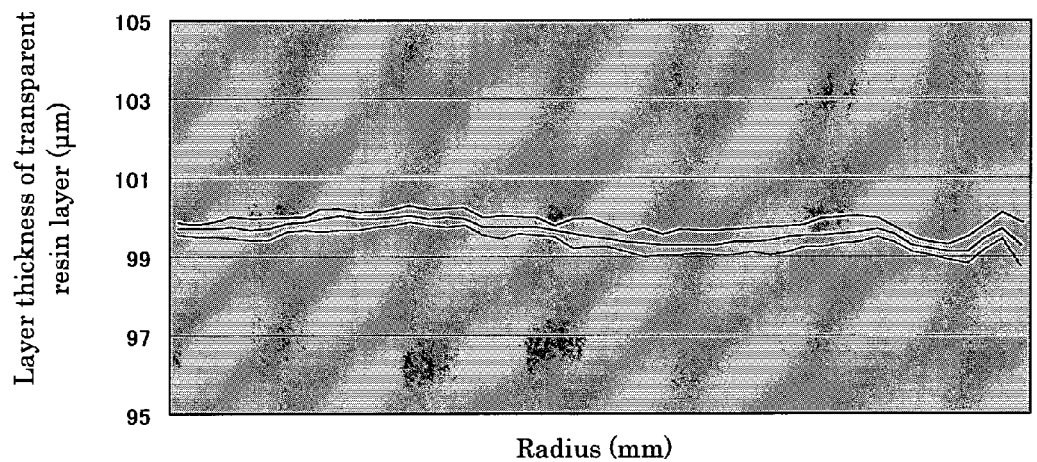
FIG. 11 is a graph showing a layer thickness distribution (in D portion) in a radial direction of the disc substrate of the spin coater in Example 4.

FIG. 9 shows a relation between an accumulated operation time of the spin coater and temperatures of the spin cup during the successive resin layer formation. FIG. 10 shows a layer thickness distribution in a radial direction of the disc substrate at the start time of operation of the spin coater, which corresponds to C portion in FIG. 9, and FIG. 11 shows a layer thickness distribution in a radial direction of the disc substrate after 7 minutes layer of the start time, which corresponds to D portion in FIG. 9.

In Example 4, as a result of feedback control of the medium temperature, it was found that the reaching temperature of the spin cup was stabilized at around 40° C. from the start time of operation of the spin coater, as shown in FIG. 9. Further, the results shown in FIGS. 10 and 11 verified that the layer thickness of resin layers was stabilized from start. Note that the number of defective products was zero.

Figure 12:
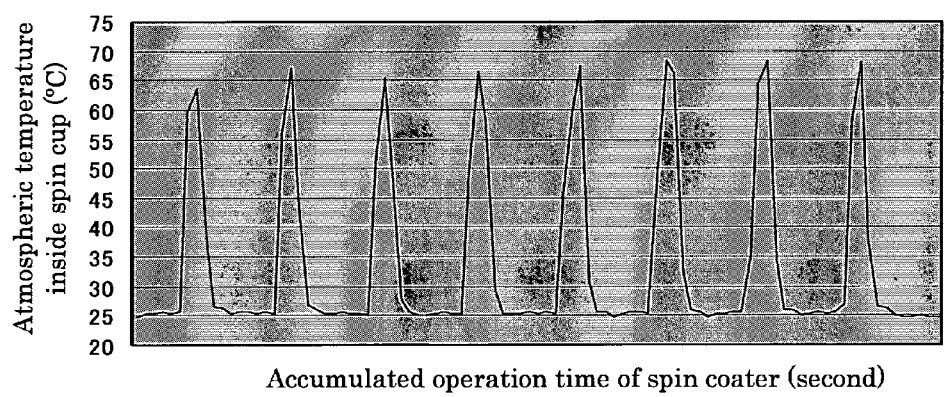
FIG. 12 is a graph showing a relation between an accumulated operation time of the spin coater in Example 4 in the case of performing no forced discharge of air in the spin cup by means of a blower and atmospheric temperature in the spin cup.
Figure 13:
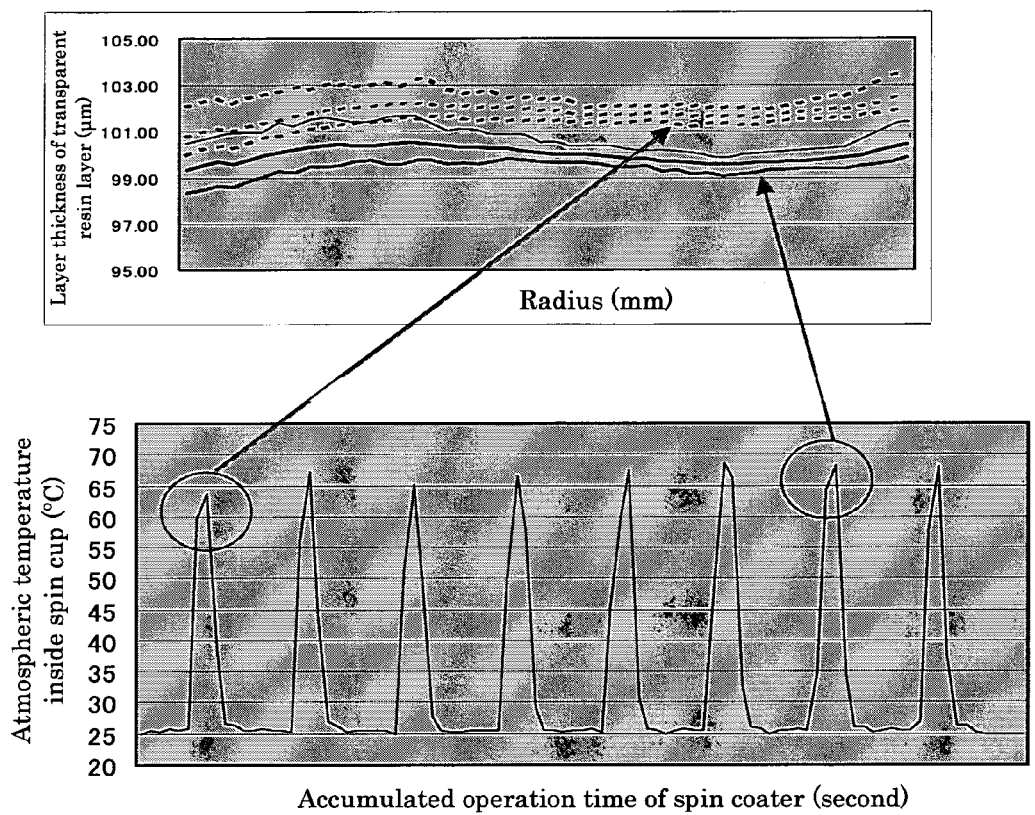
FIG. 13 top view is a graph showing a layer thickness distribution in a radial direction of the disc substrate in FIG. 12.

Next, in Example 4, during a time interval from the end time of each time spin coating process to the start time of the next spin coating process, atmospheric temperature in the spin cup was measured without performing forced discharge of the air in the spin cup by means of the blower. FIG. 12 shows the measurement results. FIG. 13 top view shows the result of layer thickness distribution of the measured resin layers. From these results, variations in peak temperature and declined temperature were observed, and it was recognized that there were variations in layer thickness among the resin layers.

Figure 14:
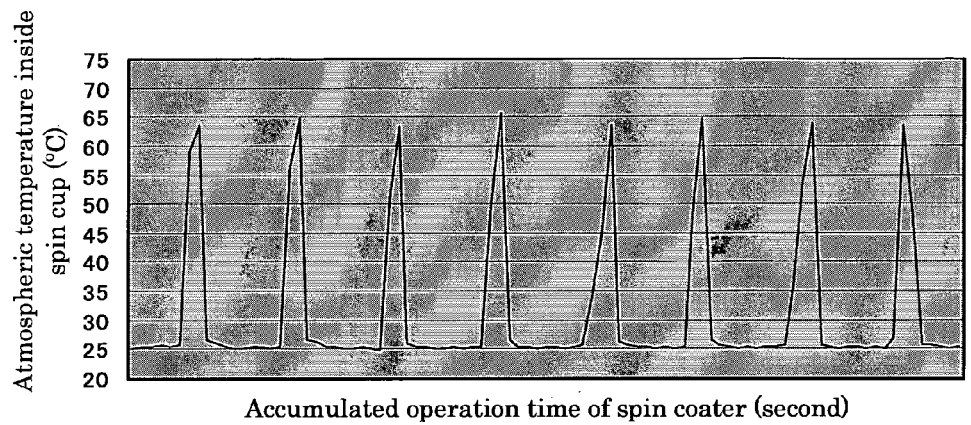
FIG. 14 is a graph showing a relation between an accumulated operation time of the spin coater in Example 4 in the case of discharging air in the spin cup using a blower and atmospheric temperature in the spin cup.
Figure 15:
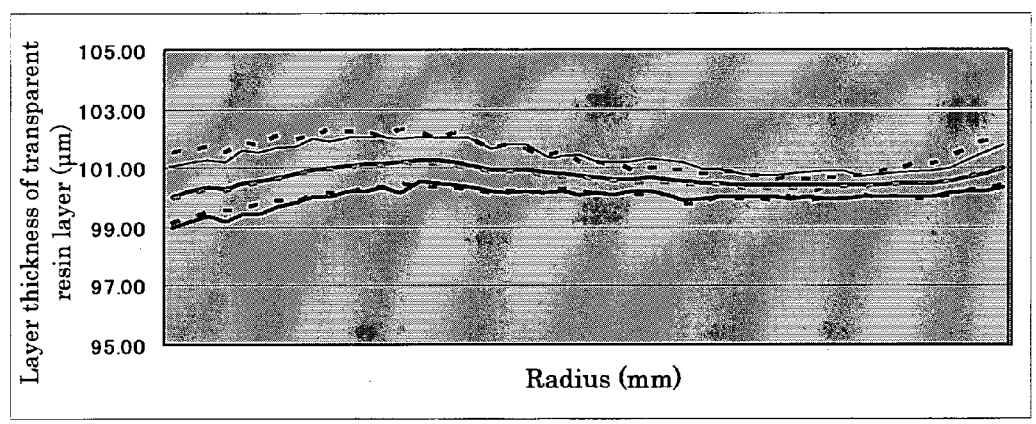
FIG. 15 is a graph showing a layer thickness distribution in a radial direction of the disc substrate in FIG. 14.

In contrast to the above test, in Example 4, as shown in FIG. 3C, during a time interval from the end time of each time spin coating process to the start time of the next spin coating process, atmospheric temperature in the spin cup was measured while performing forced discharge of air in the spin cup by means of the blower. FIG. 14 shows the measurement results. FIG. 15 shows the result of layer thickness distribution of the measured resin layers. These results show that variations in peak temperature and declined temperature are reduced and stabilization of layer thickness of resin layers can be achieved by forcedly discharging air in a spin cup during a time interval from the end time of each time spin coating process to the start time of the next spin coating process.

INDUSTRIAL APPLICABILITY

The spin coater of the present invention and the method of the present invention for controlling the temperature of a spin coater are particularly suitably used in the formation of cover layers for Blu-ray discs and, in addition, are widely applicable in the formation of protective layers, intermediate layers and the like for CD, CD-R, CD-RW, DVD etc.

The invention claimed is:

1. A spin coater comprising:
a rotation table that rotatably holds a disc substrate,
a spin-cup that surrounds the outer circumference of the disc substrate held on the rotation table,
a dripping unit configured to drip an ultraviolet-curable resin composition onto a surface of the disc substrate,
a rotating unit configured to rotate the disc substrate via the rotation table to spread the ultraviolet-curable resin composition over the surface of the disc substrate,
a heating unit configured to heat the ultraviolet-curable resin composition on the disc substrate,
a temperature controlling unit configured to control a reaching temperature of the spin cup, which is increased by the heating unit each time the ultraviolet-curable resin composition is spread, so as to be constant over multiple spin coating processes, and
a sucking unit configured to suck air in the spin cup to discharge the air from the spin cup during a time interval from the finish of each spin coating process to the start of the next spin coating process,
wherein the sucking unit has a sucking port facing an opening formed on the top surface of the spin cup and the sucking unit is movable as needed.

2. The spin coater according to claim 1, wherein the dripping unit is configured to drip the ultraviolet-curable resin composition in a circular pattern around the periphery of a round opening formed in the center of the disc substrate that is rotating by rotation of the rotating unit.

3. The spin coater according to claim 1, wherein the temperature controlling unit has a flow passage formed in the spin cup and a supplying unit configured to supply a medium to the flow passage.

4. The spin coater according to claim 3, wherein the spin cup has a main body provided with the flow passage on the surface thereof, and a heat-insulating cover for covering the flow passage.

5. The spin coater according to claim 3, wherein the temperature controlling unit comprises:
a temperature detecting unit configured to detect the temperature of the spin cup, and
a temperature adjusting unit configured to perform feedback control of the temperature of the medium based on the detected spin cup temperature.

6. An optical disc production apparatus comprising:
a spin coater, wherein the spin coater comprises:
a rotation table that rotatably holds a disc substrate,
a spin-cup that surrounds the outer circumference of the disc substrate held on the rotation table,
a dripping unit configured to drip an ultraviolet-curable resin composition onto a surface of the disc substrate,
a rotating unit configured to rotate the disc substrate via the rotation table to spread the ultraviolet-curable resin composition over the surface of the disc substrate,
a heating unit configured to heat the ultraviolet-curable resin composition on the disc substrate,
a temperature controlling unit configured to control a reaching temperature of the spin cup, which is increased by the heating unit each time the ultraviolet-curable resin composition is spread, so as to be constant over multiple spin coating processes, and
a sucking unit configured to suck air in the spin cup to discharge the air from the spin cup during a time interval from the finish of each spin coating process to the start of the next spin coating process,
wherein the sucking unit has a sucking port facing an opening formed on the top surface of the spin cup, and the sucking unit is movable as needed, and
wherein a cover layer is formed using the spin coater.

* * * * *